United States Patent [19]

Shimizu et al.

[11] Patent Number: 5,064,924

[45] Date of Patent: Nov. 12, 1991

[54] THERMOSETTING ORGANOPOLYSILOXANE COMPOSITION

[75] Inventors: Koji Shimizu; Atsushi Sakuma, both of Chiba, Japan

[73] Assignee: Dow Corning Toray Silicone Company, Ltd., Tokyo, Japan

[21] Appl. No.: 610,611

[22] Filed: Nov. 8, 1990

[30] Foreign Application Priority Data

Nov. 17, 1989 [JP] Japan .................. 1-300564

[51] Int. Cl.$^5$ .............................. C08G 77/06
[52] U.S. Cl. ...................... 528/15; 528/31; 528/32
[58] Field of Search .................. 528/15, 31, 32

[56] References Cited

U.S. PATENT DOCUMENTS

| | | | |
|---|---|---|---|
| 4,288,345 | 9/1981 | Ashby et al. | 528/15 |
| 4,481,341 | 11/1984 | Schlak et al. | 525/478 |
| 4,705,765 | 11/1987 | Lewis | 528/15 |
| 4,784,879 | 11/1988 | Lee et al. | 427/213.34 |
| 4,824,616 | 4/1989 | Shimizu et al. | 528/15 |

FOREIGN PATENT DOCUMENTS 49-134786 12/1974 Japan .

Primary Examiner—Melvyn I. Marquis
Assistant Examiner—Margaret W. Glass
Attorney, Agent, or Firm—Robert Spector

[57] ABSTRACT

One-part organosiloxane composition curable by a platinum-catalyzed hydrosilation reaction contain the catalyst encapsulated within finely divided particles of a cured silicone rubber. The compositions are storage-stable for up to several days at room temperature, yet cure relatively rapidly when heated.

7 Claims, No Drawings

THERMOSETTING ORGANOPOLYSILOXANE COMPOSITION

BACKGROUND OF THE INVENTION

1. Field of the Invention

This invention relates to heat curable organosiloxane compositions. More particularly, this invention relates to one-part organosiloxane compositions exhibiting both excellent storage stability in the vicinity of room temperature and excellent curing characteristics at elevated temperatures.

2. Background Information

Organosiloxane compositions which cure by a hydrosilation reaction between at least one alkenyl-containing organopolysiloxane and at lest one SiH-containing organohydrogenpolysiloxane are distinguished by the absence of reaction by-products and by rapid curing in deep sections. These advantages have led to their use in a wide range of applications such as adhesives, potting materials for electrical and electronic components, and release coatings for paper and films.

However, this type of organosiloxane composition suffers from a very poor storage stability and cannot be stored in a single container. Rather, the composition must be stored in two parts, with the organohydrogenpolysiloxane and the platinum-containing catalyst in separate containers.

Prior art methods for overcoming this disadvantage are based on restraining or inhibiting the catalytic activity of the catalyst. One such method uses additives that inhibit the activity of platinum-containing catalysts. Inhibitors of this type include benzotriazole, acetylenic compounds, and hydroperoxy compounds. When long-term storage stability is sought using these inhibitors, the curing characteristics of the composition are degraded and the time required for curing is lengthened. While a very storage-stable organopolysiloxane composition can be obtained, a fast curing organopolysiloxane composition cannot be obtained.

A second approach to one-part organosiloxane compositions that cure by a platinum-catalyzed hydrosilation reaction involves the use of a platinum-containing catalyst that is microencapsulated or otherwise enclosed within at least one layer of a thermoplastic organic polymer or a thermoplastic silicone resin. The melting or softening temperature of the encapsulating material is selected to correspond with the temperature at which the curable composition is heated during the curing process.

One method for encapsulating platinum-containing catalysts is described in Japanese Patent Publication [Kokai] Number 49-134786 [134,786/74], which teaches preparing a platinum-type catalyst in powder form. Silicone resin and a platinum compound adsorbed on a finely divided material, such as quartz powder, are mixed and kneaded on a hot roll, and the resulting mixture is pulverized or ground.

U.S. Pat. No. 4,481,341, which issued to Schlak et al. on Nov. 6, 1984 describes thermosetting organosiloxane compositions comprising a polyorganosiloxane containing at least two ethylenically unsaturated hydrocarbon radicals per molecule, a polyorganohydrogensiloxane containing at least two silicon bonded hydrogen atoms per molecule and a platinum-containing catalyst that is present in a finely divided, solid material, such as a silicone resin. The concentration of catalyst is equivalent to from 0.001 to 5 percent by weight of platinum metal, based on the weight of the curable composition. In accordance with the examples of this patent, the catalyst is dispersed in a solution of a silicone resin. The solution is then cast in the form of a sheet and the solid evaporated to form a solid that is subsequently pulverized to obtain a powder.

The finely divided material in which the catalyst is dispersed is virtually insoluble in either the aforementioned polyorganosiloxane or polyorganohydrogensiloxane and melts or softens at a temperature between 70 and 250 degrees C. The alleged advantage of the compositions disclosed by Schlak et al. is that the catalyst remains isolated from the other ingredients of the curable composition until the composition is heated sufficiently to melt or soften the material in which the catalyst is dispersed. Because the organosilicon composition will not cure in the absence of the catalyst, the composition can allegedly be stored for long periods of time without undergoing curing or even an increase in viscosity.

U.S. Pat. No. 4,784,879, which issued to Lee et al. on Nov. 15, 1988 describes the preparation of an encapsulated form of a platinum-containing hydrosilation catalyst. The platinum-containing catalyst is encapsulated within one or two layers of thermoplastic organic polymers. The catalyst is prepared by polymerization or precipitation of the encapsulating polymer in the presence of the catalyst. The resultant microcapsules are then washed with a liquid that is a solvent for the catalyst but not for the encapsulating polymer. The exemplified compositions require one washing with methanol and one with cyclic dimethylsiloxane oligomers to ensure their storage stability when incorporated into a curable organosiloxane composition.

The characteristic feature of all the materials described in the prior art for encapsulating platinum-containing hydrosilation catalysts is the ability of the materials to melt or soften within a specified temperature range.

Particulate forms of cured silicone rubber exhibiting diameters in the range of from 0.1 to about 500 micrometers that incorporate mineral oil or other liquid materials as releasable additives are known. The cured silicone rubber portion of these particulate materials are not considered thermoplastic materials that would be expected to undergo softening or melting in the range of from 100° to 250° C. typically employed for the curing of organosiloxane compositions by a platinum-catalyzed hydrosilation reaction.

Cured silicone rubber is typically not characterized by an abrupt change in its rheological properties in the range of from 100° to 250° C. that would allow release of a liquid material entrapped within the rubber. One would therefore not expect cured silicone rubber to be a useful encapsulating material for platinum-containing hydrosilation catalysts in one-part organosiloxane compositions of the types disclosed in the aforementioned Schlak and Lee et. al. patents.

An objective of the present invention is to provide a thermosetting organopolysiloxane composition which has an excellent storage stability in the vicinity of room temperature yet cures rapidly upon heating.

SUMMARY OF THE INVENTION

The present inventors discovered that finely divided particles of cured silicone rubber incorporating a platinum-containing hydrosilation catalyst will serve as heat-activated catalysts for one-part organosiloxane compositions that satisfy the objectives of this invention. The rubber portion of the particles can be cured using an organic peroxide or the platinum-containing catalyst included in the curable composition used to prepare the particles.

DETAILED DESCRIPTION OF THE INVENTION

This invention provides a thermosetting organopolysiloxane composition comprising (A) an organopolysiloxane containing at least two silicon-bonded alkenyl radicals in each molecule and represented by the average unit formula $$R_a SiO_{(4-a)/2}$$

where R represents an unsubstituted or halogenated monovalent hydrocarbon radical and the value of a is from 1.0 to 2.3, inclusive, (B) an organohydrogenpolysiloxane containing at least 2 silicon-bonded hydrogen atoms in each molecule in an amount sufficient to cure said composition, (C) finely divided particles of a cured silicone rubber containing an amount of a platinum-containing hydrosilation catalyst equivalent to from 1 to 50,000 ppm by weight, based on the weight of said particles, of platinum metal, where the concentration of said particles is sufficient to promote curing of said composition.

Each ingredient of the present organosiloxane compositions will now be discussed in detail.

The ORGANOSILOXANE CONTAINING ALKENYL RADICALS (INGREDIENT A)

The curable compositions of the present invention are based on an organopolysiloxane containing at least two silicon-bonded alkenyl radicals in each molecule. The substituent R in the aforementioned unit formula for this organopolysiloxane is a monovalent hydrocarbon radical exemplified but not limited to alkyl radicals such as methyl, ethyl, propyl, butyl, hexyl, and octyl; alkenyl radicals such as vinyl, allyl, and hexenyl; aryl radicals such as phenyl; or a halogenated monovalent hydrocarbon radicals such as 3,3,3-trifluoropropyl.

The value of a in the formula for this ingredient is from 1.0 to 2.3, inclusive. This organopolysiloxane may contain one or more silicon-bonded hydroxyl or alkoxy groups, and its molecular structure may consist of a straight-chain or branched siloxane framework. Moreover, its physical form, a function of its degree of polymerization, is not specifically restricted, and can range from a liquid at 25 degrees Centigrade to a gum.

In preferred embodiments of ingredient A, the alkyl radicals represented by R contain from 1 to 4 carbon atoms and the alkenyl radical is vinyl. Most preferably the alkyl radicals are methyl and the vinyl radicals are bonded to the terminal silicon atoms of ingredient A.

THE ORGANOHYDROGENPOLYSILOXANE (INGREDIENT B)

The organohydrogenpolysiloxane comprising ingredient B used in the present invention is a crosslinker for ingredient A. Ingredient B must contain at least 2 silicon-bonded hydrogen atoms in each molecule in order for the present compositions to form a network structure and cure. In addition to hydrogen atoms, ingredient B contains silicon-bonded organic groups selected from the same groups present in ingredient A. Ingredient B may contain only a single type of organic group or a mixture of two or more types of organic groups.

Ingredient B can have a straight-chain, network, or three-dimensional molecular structure, and it can be present as a homopolymer or copolymer. This ingredient can be a single polymer or a mixture of two or more types of polymers. The degree of polymerization of this ingredient should generally correspond to a viscosity range of from 0.5 to 50,000 centipoise (0.0005 to 50 Pa.s) at 25 degrees Centigrade, preferably from 1 to 10,000 centipoise (0.001 to 10 Pa.s).

The concentration of ingredient B should be equivalent to a value of from 0.5:1 to 10:1 for the molar ratio between the silicon-bonded hydrogen atoms in this ingredient and silicon-bonded alkenyl radicals in ingredient A. This range is equivalent to a concentration for ingredient B within the range of from 0.1 to 10 weight parts per 100 weight parts ingredient A.

THE PLATINUM-CONTAINING SILICONE RUBBER PARTICULATE (INGREDIENT C)

Ingredient C provides the catalyst for the hydrosilation reaction between the silicon-bonded alkenyl radicals in ingredient A and the silicon-bonded hydrogen atoms in ingredient B to form a cured material. Examples of suitable platinum-containing catalysts for this curing reaction include but are not limited to chloroplatinic acid, alcohol-modified chloroplatinic acid, platinum/olefin complexes, platinum/ketone complexes, and platinum/vinylsiloxane complexes. Among these, platinum/vinylsiloxane complexes are preferred for their high catalytic activity.

Ingredient C itself comprises finely divided particles of a cured silicone rubber that incorporates the platinum-containing catalyst. The silicone rubber portion of the particles is obtained by curing one of the following types of organosiloxane compositions an addition reaction-curing silicone composition consisting essentially of an organopolysiloxane having at least two silicon-bonded alkenyl radicals in each molecule, an organohydrogenpolysiloxane containing having at least two silicon-bonded hydrogen atoms in each molecule, and a platinum-containing catalyst;

a radical reaction-curing silicone composition consisting essentially of an organic peroxide and organopolysiloxane containing at least two silicon-bonded alkenyl radicals in each molecule; or a condensation reaction-curing silicone composition consisting essentially of an organopolysiloxane having at least two silanol groups in each molecule, an organohydrogenpolysiloxane having at least two silicon-bonded hydrogen atoms in each molecule, and platinum-containing catalyst.

Among these, silicone rubber particles obtained from the curing of addition reaction-curing silicone compositions are preferred for their rapid curing rate and excellent cure uniformity.

The concentration of platinum-containing catalyst in ingredient C should preferably be equivalent to from 0.0001 to 5.0 weight percent, more preferably from to 0.001 to 1.0 weight percent of platinum metal, based on the total weight this ingredient. The properties of cured elastomers prepared using the present compositions are compromised at catalyst concentrations equivalent to less that 0.0001 weight % of platinum metal, while the storage stability of the present compositions declines when the catalyst concentration exceeds an amount equivalent to 5.0 weight % of platinum.

The concentration of the cured silicone rubber particles constituting ingredient C should generally fall within the range of 0.1 to 100 weight parts per 100 weight parts of ingredient A.

The average particle size of the silicone rubber particles should generally fall within the range of from 0.01 to 500 micrometers and preferably within the range of 0.1 to 100 micrometers. A substantial decline in yield during manufacture of the silicone rubber particles is encountered when this average particle size falls below 0.01 micrometer. An average particle size in excess of 500 micrometers causes a deterioration in the stability of the dispersion in the diorganopolysiloxane referred to as ingredient A.

The particles of platinum-containing cured silicone rubber that constitute ingredient C can be prepared by numerous methods, the following method being preferred:

A liquid silicone composition consisting essentially of
(a) a liquid organopolysiloxane containing at least two lower alkenyl radicals in each molecule,
(b) a liquid organohydrogenpolysiloxane containing two silicon-bonded hydrogen atoms in each molecule in an amount sufficient to cure ingredient (a), and
(c) an amount of a platinum-containing catalyst equivalent to from 1 to 50,000 weight parts of platinum metal for each million weight parts (ppm) of combined ingredients (a) and (b)

is dispersed in water to form an aqueous dispersion in which said liquid silicone composition is present as the discontinuous phase. The liquid silicone composition is then cured by bringing the aqueous dispersion into contact with a liquid or gas maintained at a temperature of a least 40 degrees Centigrade.

To explain this method in greater detail, ingredient (a) is the main ingredient of the curable composition which will form the silicone rubber particles, and it undergoes curing by an addition reaction with ingredient (b) under the catalytic effect of ingredient (c). Ingredient (a) must contain at least two silicon-bonded lower alkenyl radicals in each molecule that preferably contain from 1 to about 6 carbon atoms. At fewer than 2 lower alkenyl radicals a network structure does not form and a suitable silicone particulate cannot therefore be obtained. Said lower alkenyl radical is illustrated by vinyl, allyl, and propenyl.

The lower alkenyl radicals may be present anywhere in the molecule, and the molecular structure of ingredient (a) may be any of straight chain, branch-containing straight chain, cyclic, or network. The molecular weight of this ingredient is not specifically restricted, but its viscosity will ordinarily be 1 to 100,000 centipoise at 25 degrees Centigrade. Examples of suitable organopolysiloxanes include but are not limited to:
trimethylsiloxy-terminated methylvinylsiloxane-dimethylsiloxane copolymers,
dimethylvinylsiloxy-terminated dimethylpolysiloxanes,
dimethylvinylsiloxy-terminated dimethylsiloxane-methylphenylsiloxane copolymers,
dimethylvinylsiloxy-terminated dimethylsiloxane-diphenylsiloxane-methylvinylsiloxane copolymers,
trimethylsiloxy-terminated dimethylsiloxane-methylvinylsiloxane copolymers,
trimethylsiloxy-terminated dimethylsiloxane-methylphenylsiloxane-methylvinylsiloxane copolymers,
dimethylvinylsiloxy-terminated methyl(3,3,3-trifluoropropyl)polysiloxanes,
dimethylvinylsiloxy-terminated dimethylsiloxane-methyl(3,3,3-trifluoropropyl)siloxane copolymers,
polysiloxanes composed of the $CH_2=CH(CH_3)_2SiO_{\frac{1}{2}}$ unit,
$(CH_3)_3SiO_{\frac{1}{2}}$ unit, and $SiO_{4/2}$ unit, and
methylvinylsiloxane cyclics $[(CH_3)CH_2=CHSiO]_n$ wherein $n=3$ to 25.

Ingredient (b) is a crosslinker for ingredient (a), and curing proceeds by an addition reaction between the silicon-bonded hydrogen atoms in this ingredient and the lower alkenyl radicals in ingredient (a) under the catalytic activity of ingredient (c). Ingredient (b) must contain at least 2 silicon-bonded hydrogen atoms in each molecule in order to function as a crosslinker.

The molecular structure of ingredient (b) is not specifically restricted and it may be any of straight chain, branch-containing straight chain, cyclic, and so forth. The molecular weight of this ingredient specifically restricted, however, viscosities of 1 to 50,000 centipoise (0.001 to 50 Pa.s) at 25 degrees Centigrade are preferred in order to obtain good compatibility with ingredient (a).

Ingredient (b) is preferably added in an amount equivalent to values of from 0.5:1 to 20:1 for the molar ratio between the total quantity of silicon-bonded hydrogen atoms in the ingredient (b) and the total quantity of all lower alkenyl radicals in ingredient (a). Non-limiting examples of ingredient (b) include:
trimethylsiloxy-terminated methylhydrogenpolysiloxanes,
trimethylsiloxy-terminated dimethylsiloxane-methylhydrogensiloxane copolymers,
dimethylhydrogensiloxy-terminated dimethylsiloxane-methylhydrogensiloxane copolymers,
cyclic dimethylsiloxane-methylhydrogensiloxane copolymers,
copolymers composed of $(CH_3)_2HSiO_{\frac{1}{2}}$ and $SiO_{4/2}$ units,
and copolymers composed of $(CH_3)_3SiO_{\frac{1}{2}}$, $(CH_3)_2HSiO_{\frac{1}{2}}$ and, $SiO_{4/2}$ units.

Ingredient (c) is a catalyst for the addition reaction between the silicon-bonded hydrogen atoms of ingredient (b) and the alkenyl radicals of ingredient (b). Examples of suitable catalysts included but are not limited to chloroplatinic acid, chloroplatinic acid dissolved in an alcohol or ketone and such solutions which have been aged, complex compounds between chloroplatinic acid and olefins, complex compounds between chloroplatinic acid and alkenylsiloxanes, and complex compounds between chloroplatinic acid and diketones.

The concentration of this ingredient should be equivalent to from 1 to 50,000, preferably from 10 to 1,000 weight parts of platinum metal per 1,000,000 weight parts (ppm) of the combination of ingredients (a) and (b).

The catalytic activity of the platinum-containing cured silicone rubber particles (ingredient C) prepared by this method declines when the concentration of ingredient (c) is below 1 ppm. The storage stability of the present curable compositions declines when the concentration of ingredient (c) exceeds 50,000 ppm, based on ingredients (a) and (b).

In accordance with the preferred method for preparing ingredient C, the liquid silicone rubber composition thus obtained is dispersed as the discontinuous phase in water to form an aqueous dispersion, and a variety of methods are available for the formation of this dispersion. For example, water is added to the liquid silicone rubber composition, which is then passed through a commercial colloid mill.

Alternatively, all the constituent ingredients of the liquid silicone rubber composition are directly introduced into a homogenizer followed by the addition of water and stirring.

The temperature of the aqueous dispersion containing the curable liquid silicone rubber composition is preferably maintained in the range of from zero to 25 degrees Centigrade prior to curing. At below zero degrees Centrigrade, the water freezes and an aqueous dispersion cannot be formed. Curing of the liquid silicone rubber composition occurs at temperatures in excess of 25 degrees Centigrade with a resulting strong tendency for the morphology of the final cured silicone rubber particle to become nonuniform.

In accordance with the present method, the aqueous dispersion of liquid silicone rubber composition is cured by bringing it into contact with a liquid or gas maintained at a temperature of at least 40 degrees Centigrade. Liquids suitable for this purpose are not specifically restricted as long as the liquid is capable of heating and curing the liquid silicone composition. Liquids which inhibit curing of the liquid silicone composition and organic solvents which dissolve the liquid silicone composition should be avoided.

Concrete examples of liquid heating media include but are not limited to water, liquid paraffin, waxes, and the various fluid compounds used as thermal media such as dimethylsiloxane oils and phthalate esters. Water is particularly preferred among these for its high heat capacity and ease of handling.

Various techniques are available for bringing about contact between the water-based dispersion and the heated liquid. In one such method, the water-based dispersion is continually supplied in small portions to a stirrer-equipped mixer filled with water heated at a temperature of at least 40 degrees Centigrade and is dispersed in the heated water by stirring.

Numerous techniques are also available for bringing about contact between the aqueous dispersion and a heated gas. In one such method, the water-based dispersion is sprayed into a hot oven maintained at least at 40 degrees Centigrade. In this case, it is important from the standpoint of safety that the heated oven be filled with an inert gas such as nitrogen.

OPTIONAL INGREDIENTS

In addition to the ingredients previously identified as A, B and C, the present compositions can contain addition ingredients to modify the properties of the curable composition or the cured materials prepared from these compositions, so long as these additional ingredients do not detract from the objectives of the present invention. These optional ingredients include but are not limited to:

Additives which inhibit the catalytic activity of platinum-containing catalysts, for example, acetylenically unsaturated compounds such as 2-methyl-3-butyne-2-ol and 3-methyl-1-hexyne-3-ol, various hydroperoxy compounds and benzotriazole reinforcing fillers such as fumed silica, wet-method silica, and
Surface-hydrophobicized silica
Crepe-hardening inhibitors
Polymers other than organopolysiloxanes
Organic solvents
Heat stabilizers such as iron oxide and rare earth compounds
Flame retardants such as manganese carbonate and fumed titanium oxide; and
Non-reinforcing fillers such as quartz powder, diatomaceous earth, calcium carbonate, glass fibers, and carbon black.

The curable organosiloxane compositions of the present invention can be prepared by simply mixing the aforementioned ingredients A, B and C to homogeneity together with any additional optional ingredients. While no particular restriction is placed on the mixing sequence, an advantageous method comprises dispersing the finely divided particles of cured silicone rubber containing the curing catalyst homogeneously into a small quantity of ingredient A and then adding this to a mixture of ingredients A, B, and any additional optional ingredients.

Mixing can be carried out by any means which does not destroy or fracture the catalyst-containing particles of cured silicone rubber that constitute ingredient C.

The curable organosiloxane compositions of this invention have such an excellent storage stability in the vicinity of room temperature that they can be stored for several days as a one-package composition. The composition still cures rapidly when heated.

As a result, the present curable compositions are well qualified for the preparation of a silicone rubber, silicone gel, or silicone resin, depending upon the properties required.

EXAMPLES

The following examples describe preferred embodiments of the present compositions and should not be interpreted as limiting the scope of the invention defined in the accompanying claims. All parts in the examples are by weight, cp represents centipoise, and viscosity values were measured at 25 degrees Centigrade.

REFERENCE EXAMPLE 1

Preparation of a Platinum-Containing Catalyst 160 g. of 1,3-divinyltetramethyldisiloxane and 32.0 g. chloroplatinic acid ($H_2PtCl_6 \cdot 6H_2O$) were combined at room temperature and then mixed for 1 hour while being heated at 120 degrees Centigrade under a stream of nitrogen gas. The platinum black produced as a by-product was removed by filtration, and the acid was removed by washing with water to yield a reaction product containing the chloroplatinic acid/1,3-divinyltetramethyl-disiloxane complex. The platinum metal concentration in this reaction product was 6.7 weight %.

EXAMPLE 1

A mixture (mixture A) was prepared by the addition with mixing of 6 parts trimethylsiloxy-terminated methylhydrogenpolysiloxane exhibiting a viscosity of 5 cp. (0.0005 Pa.s) and a silicon-bonded hydrogen atom content of 0.8 weight % into 100 parts of a dimethylvinylsiloxy-terminated dimethylpolysiloxane exhibiting a viscosity of 1,000 cp. (1 Pa.s) and a vinyl radical content of 0.5 weight %.

A similar mixture (mixture B) was prepared by the addition with mixing of 1.5 parts of the platinum-type catalyst (platinum content=6.7 weight %) obtained in Reference Example 1 to 100 parts of the same dimethylpolysiloxane described earlier in this example. Mixtures A and B were placed in separate storage tanks for liquid silicone rubber compositions. Using a pressure-delivery pump, the two mixtures were supplied at a weight ratio of 1:1 to a stirrer-equipped mixer which had been pre-cooled to −10 degrees Centigrade to yield mixture C.

Again using a pressure-delivery pump, 500 parts of mixture C were supplied to a colloid mill manufactured by Manton-Gaulin which has been pre-cooled to +5 degrees Centigrade at the same time as 1,000 parts water pre-cooled to +5 degrees Centrigrade.

The resultant combination of mixture C and water was milled at 1,400 rpm using a 0.1 mm gap to yield an aqueous dispersion of a curable liquid silicone rubber composition. At this point the temperature of the aqueous dispersion was +5 degrees Centigrade. This dispersion was then immediately and continuously introduced into a stirrer-equipped mixer filled with hot water at +80 degrees Centigrade using a stirrer velocity of 10 rpm. The dispersion was converted to spherical particles of a cured spherical silicone rubber with an average particle diameter of 10 micrometers.

A mixture D was then prepared by mixing 100 parts of a dimethylvinylsiloxy-terminated dimethylpolysiloxane exhibiting a viscosity of 2,000 cp (2 Pa.s) and a vinyl radical content of 0.25 weight %, 15 parts of fumed silica with surface area of 200 m$^2$/g, 0.03 parts of 3,5-dimethyl-1-hexyne-3-ol as a platinum catalyst inhibitor, and 3 parts trimethylsiloxy-terminated methylhydrogenpolysiloxane exhibiting a viscosity of 5 cp (0.005 Pa.s) and a silicon-bonded hydrogen atom content of 0.8 weight %.

1.2 Parts of the platinum-containing cured silicone rubber particles (ingredient C) prepared as described in the preceding section of this example were subsequently blended into 100 parts of mixture D to yield a curable organosiloxane composition of the present invention. The composition exhibited a viscosity of 3,600 poise.

The physical properties of the elastomer obtained by curing this composition were measured in accordance with the test methods described in Japanese Industrial Standards (JIS) K 6301. English language translations of these test methods are commercially available.

Two of the thermal curing properties of the curable organosiloxane composition were measured at 130 degrees Centigrade using a Curastorotor (Curastometer Model 3 from Toyo Baldwin Kabushiki Kaisha). These characteristics were 1) the time to initiation of curing ($I_p$) and 2) the time for the torque to reach 90% of its maximum value ($T_{90}$).

In addition, the storage stability of the composition was evaluated by measuring the increase in viscosity exhibited by the composition at room temperature. The results of all the determinations are reported in Table 1.

TABLE 1

| Property | Measured Value |
| --- | --- |
| Physical properties | |
| hardness (JIS A) | 55 |
| tensile strength (kg/cm$^2$) | 60 |
| tensile elongation (%) | 320 |
| Curing characteristics immediately after preparation | |
| $I_p$ (seconds) | 50 |
| $T_{90}$ (seconds) | 70 |
| Curing characteristics after 7 days | |
| $I_p$ (seconds) | 22 |
| $T_{90}$ (seconds) | 30 |
| Storage stability | |
| viscosity (poise) immediately after preparation | 3600 |
| viscosity (poise) after 7 days | 5500 |

EXAMPLE 2

10 Grams of the platinum catalyst-containing cured silicone rubber particles prepared as described in Example 1 were washed once with water followed by a wash by stirring in approximately 500 g. methyl alcohol. A curable organosiloxane composition was then prepared as described in Example 1, except that the washed cured silicone rubber particles were used in place of the particles used in the curable composition of Example 1. The physical properties of this organopolysiloxane composition were then measured as described in Example 1, and these results are reported in Table 2.

TABLE 2

| Property | Measured Value |
| --- | --- |
| Physical properties | |
| hardness (JIS A) | 55 |
| tensile strength (kg/cm$^2$) | 60 |
| tensile elongation (%) | 320 |
| Curing characteristics immediately after preparation | |
| $I_p$ (seconds) | 55 |
| $T_{90}$ (seconds) | 75 |
| Curing characteristics after 7 days | |
| $I_p$ (seconds) | 25 |
| $T_{90}$ (seconds) | 35 |
| Storage stability | |
| viscosity (poise) immediately after preparation | 3600 |
| viscosity (poise) after 7 days (poise) | 4900 |

EXAMPLE 3

Cured silicone rubber particles incorporating a platinum-containing catalyst were prepared using the procedure described in Example 1 using 100 parts of 1,3,5,7-tetramethyl-1,3,5,7-tetravinylcyclotetrasiloxane containing 31.4 weight percent of vinyl radicals in place of the dimethylpolysiloxane, 200 parts of the same methylhydrogenpolysiloxane used in example 1 and 1.9 parts of the same platinum-containing catalyst. The cured particles exhibited an average particle size of 1.2 micrometers. The particles were then washed with water and methanol as described in example 2 to yield ingredient C'.

A curable organosiloxane composition of this invention was then prepared using the same ingredients described in example 1, substituting cured silicone rubber particles identified as ingredient C' for the cured silicone rubber particles of example 1. The curing properties of the composition and the physical properties of the cured product were measured as described in example 1, and the results are reported in Table 3.

For purposes of comparison, a curable organosiloxane composition was also prepared as described in the preceding section of this example, but using the platinum-containing catalyst itself in place of the cured silicone rubber particles containing the catalyst. The platinum content in the two curable compositions was the same.

The physical properties, curing characteristics, and storage stability of this composition were measured in the same manner, and the results are reported in Table 3 as Comparison Example 1.

TABLE 3

| Property | present invention | Comparison Example 1 |
|---|---|---|
| Physical properties | | |
| hardness (JIS A) | 55 | 57 |
| tensile strength (kg/cm$^2$) | 60 | 58 |
| tensile elongation (%) | 320 | 350 |
| Curing characteristics immediately after preparation | | |
| $I_P$ (seconds) | 90 | 20 |
| $T_{90}$ (seconds) | 160 | 25 |
| Curing characteristics after 7 days | | |
| $I_P$ (seconds) | 70 | not measurable due to curing after 3 days |
| $T_{90}$ (seconds) | 140 | |
| Storage stability | | |
| viscosity (poise) immediately after preparation | 3600 | not measurable |
| viscosity (poise) after 7 days | 4700 | not measurable |

That which is claimed is:

1. A thermosetting organosiloxane composition comprising
   (A) an organopolysiloxane containing at least two silicon-bonded alkenyl radicals in each molecule and represented by the average unit formula $$R_aSiO_{(4-a)/2}$$

where R represents an unsubstituted or halogenated monovalent hydrocarbon radical and the value of a is from 1.0 to 2.3, inclusive,
   (B) an organohydrogenpolysiloxane containing at least 2 silicon-bonded hydrogen atoms in each molecule in an amount sufficient to cure said composition, and
   (C) finely divided particles of a cured silicone rubber containing an amount of a platinum-containing hydrosilation catalyst equivalent to from 1 to 50,000 ppm by weight, based on the weight of said particles, of platinum metal, where the concentration of said particles is sufficient to promote curing of said composition.

2. An organosiloxane composition according to claim 1 wherein the viscosity of said organohydrogenpolysiloxane is from 0.5 to 50,000 cps at 25° C., the concentration of said organohydrogenpolysiloxane is from 0.1 to 10 parts by weight per 100 parts of said organopolysiloxane, the concentration of said particles is from 0.1 to 100 parts by weight per 100 parts by weight of said organopolysiloxane, the concentration of said catalyst in said particles is equivalent to from 10 to 10,000 ppm of platinum metal, based on the weight of said particles, and the average diameter of said particles is from 0.01 to 500 micrometers.

3. An organosiloxane composition according to claim 2 wherein the average diameter of said particles is from 0.1 to 100 micrometers, R represents alkyl containing from 1 to 4 carbon atoms and alkenyl radicals, the viscosity of said organohydrogenpolysiloxane is from 1 to 10,000 cps, and said organohydrogenpolysiloxane is an alkylhydrogenpolysiloxane.

4. An organosiloxane composition according to claim 3 where said organopolysiloxane is a dimethylvinyl-terminated dimethylpolysiloxane, said alkylhydrogenpolysiloxane is a methylhydrogenpolysiloxane and said composition includes a reinforcing silica filler.

5. An organosiloxane composition according to claim 1 wherein said particles of cured silicone rubber are prepared using the following sequence of steps:
   1) preparing an aqueous dispersion comprising as the discontinuous phase a liquid organosiloxane material consisting essentially of
      (a) a liquid organopolysiloxane containing at least two lower alkenyl radicals in each molecule,
      (b) a liquid organohydrogenpolysiloxane having at least two silicon-bonded hydrogen atoms in each molecule, and
      (c) an amount of a platinum-containing hydrosilation catalyst equivalent to from 1 to 50,000 ppm by weight of platinum metal, based on the combined weight of ingredients (a) and (b)
   2) curing said organosiloxane material by bringing said dispersion into contact with a liquid or gas maintained at a temperature of a least 40 degrees Centigrade.

6. A method according to claim 5 where the average diameter of said particles is from 0.001 to 500 micrometers, the amount of said catalyst is equivalent to from 10 to 1000 ppm by weight of platinum metal, based on the combined weight of ingredients (a) and (b), said dispersion is maintained at a temperature of from 0° to 25° C. prior to curing, said liquid is water and the viscosity of ingredient (b) is from 1 to 50,000 cp.

7. A method according to claim 6 where said liquid organopolysiloxane is a dimethylpolysiloxane, the alkenyl radicals in ingredient (a) are vinyl, ingredient (b) is a methylhydrogen-polysiloxane and the concentration of ingredient (b) is sufficient to provide a molar ratio of silicon-bonded hydrogen atoms to alkenyl radicals in ingredient (a) of from 0.5:1 to 20:1.

* * * * *